United States Patent [19]

Hirahara et al.

[11] Patent Number: 4,949,990
[45] Date of Patent: Aug. 21, 1990

[54] STEERING COLUMN FIXING STRUCTURE FOR A VEHICLE

[75] Inventors: Shinichi Hirahara; Hiroyuki Kawanishi; Naoto Shibui, all of Wako, Japan

[73] Assignee: Honda Giken Kogyo Kabushiki Kaisha, Tokyo, Japan

[21] Appl. No.: 260,850

[22] Filed: Oct. 21, 1988

[30] Foreign Application Priority Data

Dec. 18, 1987 [JP] Japan .................. 62-321018

[51] Int. Cl.$^5$ .................. B60R 21/05; B62D 1/19
[52] U.S. Cl. .................. 280/750; 280/752
[58] Field of Search .......... 280/775, 750, 751, 752, 280/777, 780; 74/493; 180/90

[56] References Cited

U.S. PATENT DOCUMENTS

| | | | |
|---|---|---|---|
| 3,938,821 | 2/1976 | Haas et al. | 280/750 |
| 4,102,218 | 7/1978 | Nakao et al. | 74/493 |
| 4,194,762 | 3/1980 | Sudo | 280/751 |
| 4,383,704 | 5/1983 | Yoshitsugu | 280/750 |
| 4,434,999 | 3/1984 | Sato | 280/752 |

FOREIGN PATENT DOCUMENTS 55-91371 6/1980 Japan .

Primary Examiner—Charles A. Marmor
Assistant Examiner—Karin Tyson
Attorney, Agent, or Firm—Armstrong, Nikaido, Marmelstein, Kubovcik & Murray

[57] ABSTRACT

Energy absorbing structure provided under steering column cover between the fixing hardware for the column and a potentially colliding driver's knee.

4 Claims, 2 Drawing Sheets

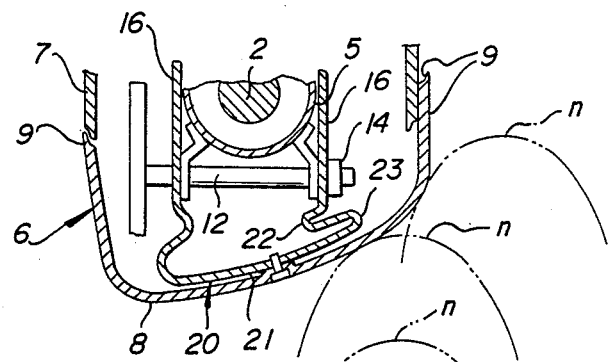
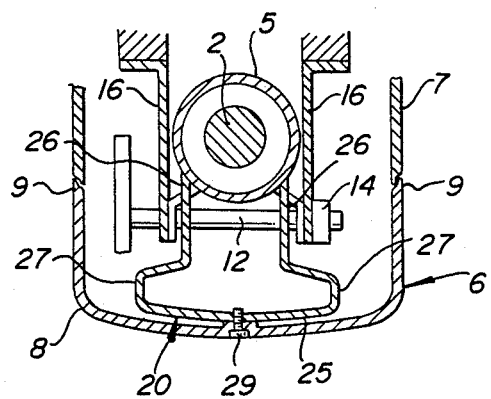
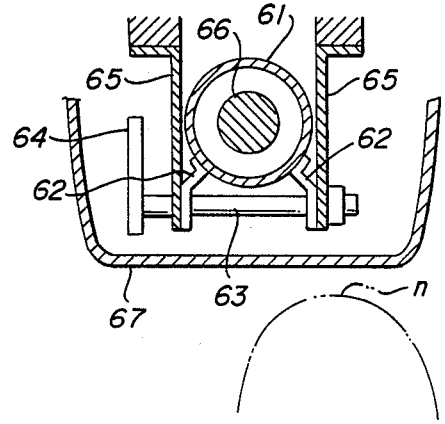
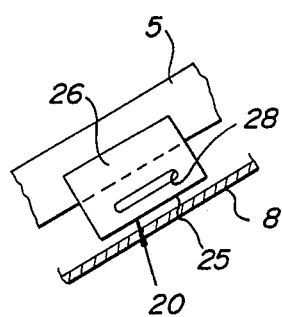

STEERING COLUMN FIXING STRUCTURE FOR A VEHICLE

BACKGROUND OF THE INVENTION

The present invention relates to a steering column fixing structure for a vehicle.

In this specification, "forward", "behind", "front", and "rear" are defined along the longitudinal axis of the vehicle considered in a top plan view in the normal direction of travel of the vehicle.

Japanese Utility Model Laid-open (Kokai) No. 55-91371 discloses a steering system for a vehicle, including an adjustable-tilt steering column. FIG. 6 shows an exemplary steering column fixing structure for an adjustable steering system.

Shown in FIG. 6 are a steering column 61, column brackets 65, a steering shaft 66, and a column cover 67. The steering column 61 receiving the steering shaft 66 therethrough is fixed to a tilting shaft 63 with stays 62. The tilting shaft 63 is inserted through slots formed respectively in the column brackets 65. A tilt adjusting lever 64 is joined to one end of the tilting shaft 63 to adjust the tilt of the steering column 61. The tilting shaft 63 can be fixed to the column brackets 65.

The knee n of the passenger must be protected so that the knee n will not collide, even through the column cover 67, with fixed parts such as the column brackets 65 when, by any change, the knee n of the passenger is caused to move by a forward inertial force.

Accordingly, it is an object of the present invention to provide a steering column fixing structure for fixing the steering system of a vehicle, capable of preventing the collision of the knee or the like of the passenger with the steering column fixing parts and absorbing external energy to protect the knee or the like of the passenger.

SUMMARY OF THE INVENTION

To achieve the object of the invention, the present invention provides a steering column fixing structure for fixing a steering column (5) supported on the body of the vehicle by column brackets (16), characterized in that energy absorbing means (20) for absorbing external force exerted on the steering column (5) from behind the same is provided near the column brackets (16).

More concretely, the steering column (5) is an adjustable-tilt steering column covered with a column cover (6) and fixedly supported on the body of the vehicle by the column brackets (16) provided with a tilt adjusting unit so that the tilt thereof is adjustable. The energy absorbing means (20) is provided behind the column brackets (16) within the column cover (6), and the column cover (6) is yieldable to external force exerted thereon from behind the same.

Since the energy absorbing means (20) is provided near the column brackets (16) behind the steering column (5) to absorb external force exerted on the column cover (6) from behind the same, the energy absorbing means (20) deforms to absorb the external energy to protect the knee n of the passenger by preventing the knee n from colliding with the steering column fixing parts when, by any chance the knee n or the like of the passenger is caused to move toward the steering column fixing parts by a forward inertial force to collide with the steering column fixing parts.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3 is a cross-sectional view, similar to FIG. 2, of assistance in explaining the energy absorbing function of the steering column fixing structure of FIG. 2;

FIG. 4 is a cross-section view of a steering column fixing structure, in a second embodiment, according to the present invention;

FIG. 5 is a fragmentary side elevation showing a modification of the steering column fixing structure of FIG. 4; and FIG. 6 is a cross-sectional view of a conventional steering column fixing structure.

DETAILED DESCRIPTION OF PREFERRED EMBODIMENTS

Figure 1:
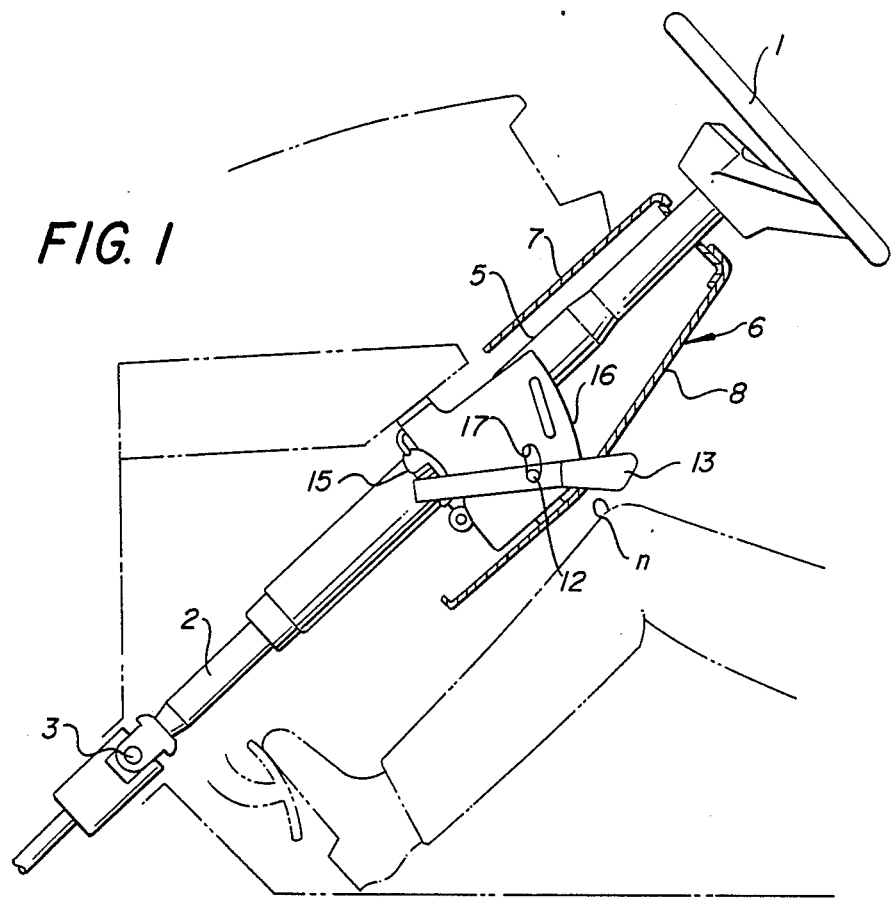
FIG. 1 is a schematic side elevation of a steering system incorporating the present invention.
Figure 2:
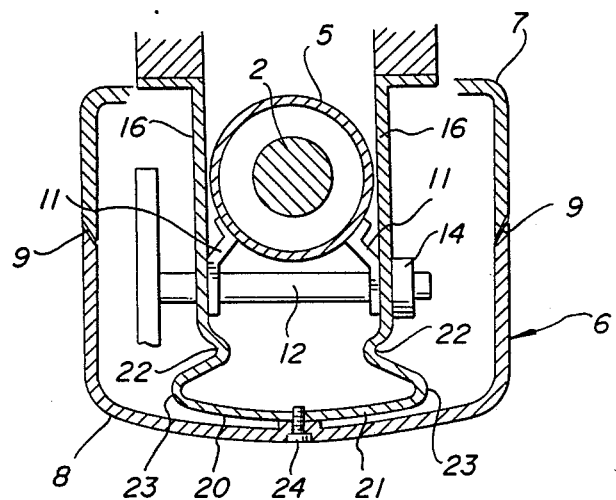
FIG. 2 is a cross-sectional view of a steering column fixing structure, in a first embodiment, according to the present invention.

FIG. 1 shows the general constitution of an adjustable-tilt steering system incorporating the present invention. Shown in FIG. 1 are a steering wheel 1, a steering shaft 2, a steering column 5, and a column cover 6. The steering wheel 1 is attached to the upper end of the steering shaft 2. The steering shaft 2 is extended through the steering column 5 and is jointed at the lower end thereof to a universal joint 3 so as to be swingable on the pivot pin of the universal joint for tilt adjustment. The steering column 5 is supported by stays 11 and a tilting shaft 12 on column brackets 16 as shown in FIG. 2. The steering column 5 is fixed through the stays 11 to the tilting shaft 12 which in turn is received through slots 17 respectively formed in the column brackets 16 fixed to the body of the vehicle. The tilting shaft 12 has one end jointed to a tilting lever 13 and the other end screwed in a fastening nut 14 fixed to one of the column brackets 16. In FIG. 1, indicated at 15 is a column hanger spring.

The upper portion of the steering column 5 is covered with a column cover 6 formed of a plastic resin material. The tilting lever 13 is positioned outside the side wall of the column cover 6.

As is well known, the tilting lever 13 is turned in one direction to unfasten the tilting shaft 12 from the fastening nut 14 to move the tilting shaft 12 along the slots 17 of the column brackets 16 for adjusting the tilt of the steering column 5, and the tilting lever 13 is turned in the opposite direction to fasten the tilting shaft 12 to the fastening nut 14, hence, to the column brackets 16.

Energy absorbing means 20 is provided behind the column brackets 16 within the column cover 6 covering the steering column 5.

In the first embodiment, the energy absorbing means 20 is formed integrally with the column brackets 16 as shown in FIG. 2. In integrally forming the column brackets 16 and the energy absorbing means 20, a single metallic plate is bent to form the right and left brackets 16 and a bulge 21. The bulge 21 merges through right and left grooved portions 22 into the respective rear parts of the right and left brackets 16. The right and left corners 23 of the bulge 21 and the right and left grooved portions 22 are easily yieldable portions.

The column cover 6 consists of a front column cover 7 and a rear column cover 8. The corresponding joining edges of the front column cover 7 and the rear column cover 8 are formed respectively in scarfs 9. The rear column cover 8 is fixed to the central portion of the rear surface of the bulge 21, namely, the energy absorbing means 20, with a screw 24.

When, by any change, the knee n of the passenger driver is caused to collide with the rear column cover 8 by a forward inertial force, the bulge 21 serving as the energy absorbing means 20 yields easily particularly by the buckling of the easily yieldable portions, namely, the right and left grooved portions 22 and the right and left corners 23, to absorb external energy exerted on the rear column cover 8, so that the collision of the knee n with the steering column fixing parts such as the column brackets 16 and the tilting shaft 12 is prevented.

The scarfs 9 formed in the right and left edges of the rear column cover 8 are formed so as to be matched respectively with the scarfs 9 in the right and left edges of the front column cover 7 and so as to slide outwardly relative to the scarfs 9 of the front column cover 7. Accordingly, when the rear column cover 8 is pressed by the knee n of the passenger, the right and left edges of the rear column cover 8 slide away easily from the right and left edges of the front column cover 7, so that the rear column cover 8 is inclined, for example, as shown in FIG. 3 to allow the knee n slide outwardly along the rear column cover 8 to escape from the column fixing parts. Since the rear column cover 8 is thus inclined, the knee n is able to escape outwardly event when the same is caused to collide again with the rear column cover 8.

Since the bulge 21 is wide, a portion of the bulge 21 covers the end portion of the tilting shaft 12 when the bulge 21 is deformed, to prevent the collision of the knee n with the end portion of the tilting shaft 12.

A steering column fixing structure, in a second embodiment, according to the present invention will briefly be described hereinafter with reference to FIG. 4. Energy absorbing means 20 and column brackets 16 are formed individually. A single metallic plate is bent to form right and left leg portions 26 and a bulge 25 interconnecting the respective rear parts of the leg portions 26. The bulge 25 is connected to a steering column 5 by fixing the front edges of the leg portions 26 to the steering column 5 so that the bulge 25 is positioned behind the column brackets 16. The bulge 25 has easily yieldable right and left corners 27.

A rear column cover 8 is fixed to the central portion of the rear surface of the bulge 5 serving as the energy absorbing means 20 with a screw 29.

The function of the energy absorbing means 20 (bulge 25) separate from the column brackets 16 is the same as that of the energy absorbing means 20 of the first embodiment.

The right and left easily yieldable corners of the bulge serving as the energy absorbing means can be formed, for example, by forming slits 28 respectively in the right and left corners of the bulge 25. The easily yieldable corners may be of any suitable conformation.

Although the present invention has been described with reference to the preferred embodiments thereof as applied to an adjustable-tilt steering system, the energy absorbing means may be incorporated into the steering column fixing structure of a steering system in which the tilt of the steering column is not adjustable. Furthermore, the energy absorbing means is not limited to those described hereinbefore, but may be of any suitable construction.

As apparent from the foregoing description, according to the present invention, an energy absorbing means for absorbing external force applied thereto from behind is provided behind a steering column near the column brackets. Therefore, energy exerted on the energy absorbing means by the knee or the like of the passenger due to the forward inertial sliding movement of the passenger is absorbed by the deformation of the energy absorbing means to prevent the collision of the knee or the like of the passenger with the steering column fixing parts, so that the knee or the like of the passenger can be protected from injury.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A steering column fixing structure for a vehicle comprising column brackets fixing a steering column to the body of the vehicle and incorporating a tilt adjusting unit for adjusting the tilt of the steering column, a column cover covering the steering column and being yieldable to external force exerted thereon from behind the same, said column cover having two sections each having a pair of abutting scarfs, and energy absorbing means provided behind the column brackets and within the cover for absorbing external force exerted on the steering column from behind the same, said energy absorbing means comprising an integrally formed bulge joining rearward ends of the column brackets and having corners which define easily yieldable portions, wherein said bulge has a slightly curved broad surface extending in parallel with an inside surface of said column cover and further wherein said broad surface has a width substantially wider than a width of said column brackets.

2. The steering column fixing structure of claim 1, wherein said energy absorbing means further comprises left and right respective concave portions.

3. The steering column fixing structure of claim 1 further comprising a fixing means for fixing said energy absorbing means and said column cover.

4. The steering column fixing structure of claim 1, wherein said pair of abutting scarfs comprise matched tapered surfaces.

* * * * *